Patented July 26, 1949

2,477,312

UNITED STATES PATENT OFFICE 2,477,312

PREPARATION OF ALDEHYDES BY STEAM OXIDATION OF ETHERS

Paul T. Parker, Baton Rouge, La., assignor to Standard Oil Development Company, a corporation of Delaware No Drawing. Application January 25, 1946, Serial No. 643,477

4 Claims. (Cl. 260—601)

This invention relates to a method of utilizing an aliphatic ether to produce an aldehyde. More particularly, it relates to the conversion of a volatile saturated aliphatic ether, such as ethyl ether, to a corresponding aldehyde.

Since large quantities of aliphatic ethers have been made available as by-products in synthesizing alcohols from olefins, there has been a need for practical methods of converting the ethers to other commercially useful products.

It is known from classical organic chemistry that ethers are slowly hydrolyzed or hydrated on heating with dilute acids to corresponding alcohols:

$$(C_2H_5)_2O + H_2O = 2C_2H_5OH$$

Methods have been proposed for obtaining hydration of ethers to alcohols more rapidly by using steam under high pressures and a solid hydrating catalyst. It has been reported that a 23% yield of ethyl alcohol is obtained by reacting diethyl ether with steam at temperatures below 600° F. in the presence of alumina and that at higher temperatures the diethyl ether is decomposed to ethylene. There have also been reports that diethyl ether is oxidized to acetic acid on heating in the presence of an oxidation catalyst. Insofar as is known, a practical method of reacting ethers with steam in the presence of a suitable catalyst to form good yields of aldehydes has not been suggested.

An object of this invention is to provide a commercially feasible method of reacting an ether with steam under selective dehydrogenation conditions which favor aldehyde formation.

Ethers are known to be stable compounds in which the oxygen bridge C—O—C is difficult to disrupt. Cleavage of this bridge is obtained under certain conditions of double decomposition with steam or acids and generally the cleavage has led to the formation of alcohols.

While investigating the possibility of selectively removing hydrogen from C–C links in an ether without cleavage, as, for example, in catalytically dehydrogenating diethyl to vinyl ether, I discovered conditions under which the reaction went beyond unsaturation of C–C links to a cleavage of the oxygen bridge that resulted in aldehyde formation. The net reaction in the conversion of the ether to aldehyde may be represented by the following equation:

$$(C_2H_5)_2O + H_2O \rightarrow 2CH_3CHO + 2H_2$$

An important factor in this selective conversion of ethers to aldehydes is now found to be the use of a catalyst having a marked dehydrogenating effect at moderately elevated temperatures in the range of about 750° F. to 950° F. By having the catalyst exert a marked dehydrogenating effect at these temperatures, the dehydrating and splitting conversion of ethers to alcohols and olefins is suppressed. Therefore, highly active dehydrogenating catalysts which may be used to favor the formation of aldehydes are typified by copper, nickel, platinum, palladium, and similar substances known to be highly active in both hydrogenating and dehydrogenating reactions. To some extent metal oxide catalysts of hydrogenating-dehydrogenating activity at temperatures in the range of 750° to 950° F. may be used, as for example oxides of chromium and molybdenum. Also, the active hydrogenating-dehydrogenating catalysts are preferably used supported on carriers such as clay, alumina, silica gel, or metal oxides which promote activity of the catalyst.

Another factor in the selective conversion to aldehydes is control of the proportion of steam. The preferred proportion of steam is approximately the stoichiometric equimolar amount with respect to the ether. The ratio of steam to ether may vary from about ½ to 1 mole of steam per mole of ether.

Adjustment of contact time of feed rate may be made for specific catalyst activity, specific reactants, concentrations of the reactants, temperature, pressure, and yield rate desired. A practical feed rate is a space velocity of about 1.8 volumes of liquid reactants per volume of catalyst per hour, or in the range of about 0.5 to 2 liquid volumes per volume of catalyst per hour.

Preferred modes of conducting conversion are indicated by the following illustrative examples, which are not intended to limit the invention:

Examples

Runs were made with feeds containing approximately equimolar proportions of diethyl ether and steam at a feed rate of 1.8 liquid volume per volume catalyst per hour. The feed was passed over a supported copper catalyst. In one run carried out at 750° F., 5% acetaldehyde was recovered. In another run at 800° F., a 20% yield of acetaldehyde resulted.

As the reaction temperature was raised above 750° F. to temperatures in the range of 800° F. to 850° F., the aldehyde yield was increased to an optimum and an approximate upper limit of the reaction temperature was indicated to be about 950° F., above which excessive decomposition tends to occur.

Most satisfactory yields are obtained with a highly active metal catalyst, e. g., reduced copper, on an adsorbent clay support such as Attapulgus clay. Alumina is a satisfactory support for the metal catalysts, MoO₃, or Cr₂O₃ in the desired reaction.

The reactants are preferably maintained under low pressure which varies with the reaction temperature and the vapor pressures of the reactants. In converting diethyl ether at 800° F., the pressure in the reaction zone is preferably about 15 pounds per square inch absolute, but lower or somewhat higher pressures may be used.

The selective conversion of ethers to aldehydes may be applied to various mixed or simple aliphatic ethers, but is most advantageous when applied to diethyl ether. It may also be applied to unsaturated aliphatic ethers, such as vinyl ether, or in general to C₄ to C₆ aliphatic ethers.

Various forms of apparatus may be used for carrying out the process. The catalyst may be used in a fixed bed or be suspended in the reaction mixture. Unreacted ether may be recycled to enhance the ultimate yield of aldehyde. Also, an aqueous distillate phase from which aldehyde product is separated may be vaporized and used in a reactor to supply steam and reactants convertible to aldehyde product under the conditions described to obtain additional yields of aldehyde.

I claim:

1. The method of converting an aliphatic ether to an aldehyde which comprises contacting a mixture consisting essentially of an aliphatic ether and steam with an active dehydrogenating catalyst at a temperature of about 750° F. to 950° F. whereby reaction is promoted between the ether and steam the ratio of the steam to the ether being from ½ to 1 mole of steam per mole of ether.

2. The method of converting an aliphatic ether to an aldehyde which comprises contacting approximately equimolar proportions of steam and an aliphatic ether in the absence of other oxidizing gases with an active metallic dehydrogenating catalyst in the range of 750° F. to 950° F. whereby reaction is promoted between the ether and steam.

3. The method of converting diethyl ether to acetaldehyde which comprises contacting steam and diethyl ether in the absence of other oxidizing gases with an active dehydrogenating catalyst containing copper on a solid adsorbent support at a temperature in the range of 750° F. to 950° F. whereby reaction is promoted between the ether and steam, the ratio of the steam to the ether being from ½ to 1 mole steam per mole of ether.

4. The method of converting diethyl ether to acetaldehyde which comprises contacting approximately equimolar proportions of steam and diethyl ether in the absence of other oxidizing gases with a copper catalyst on an adsorbent clay at a temperature in the range of about 800° F. to 850° F. whereby reaction is promoted between the ether and steam and with a feed rate of 0.5 to 2 volumes of liquid reactants per volume of catalyst per hour.

PAUL T. PARKER.

REFERENCES CITED

The following references are of record in the file of this patent:

UNITED STATES PATENTS

| Number | Name | Date |
|---|---|---|
| 1,849,844 | Lloyd et al. | Mar. 15, 1932 |
| 2,031,200 | Baur | Feb. 18, 1936 |
| 2,246,569 | Brown | June 24, 1941 |

FOREIGN PATENTS

| Number | Country | Date |
|---|---|---|
| 168,291 | Germany | Oct. 28, 1904 |